United States Patent
Guggolz et al.

(10) Patent No.: US 7,496,442 B2
(45) Date of Patent: Feb. 24, 2009

(54) METHOD FOR OPERATING A DRIVE TRAIN OF A MOTOR VEHICLE

(75) Inventors: Manfred Guggolz, Rutensheim (DE); Werner Hillenbrand, Neuffen (DE); Markus Veit, Pliezhausen (DE)

(73) Assignee: Daimler AG, Stuttgart (DE)

( * ) Notice: Subject to any disclaimer, the term of this patent is extended or adjusted under 35 U.S.C. 154(b) by 411 days.

(21) Appl. No.: 10/528,429

(22) PCT Filed: Aug. 30, 2003

(86) PCT No.: PCT/EP03/09645
§ 371 (c)(1),
(2), (4) Date: Dec. 7, 2005

(87) PCT Pub. No.: WO2004/029484
PCT Pub. Date: Apr. 8, 2004

(65) Prior Publication Data
US 2006/0142918 A1 Jun. 29, 2006

(30) Foreign Application Priority Data
Sep. 19, 2002 (DE) ................ 102 43 495

(51) Int. Cl.
*F16H 61/04* (2006.01)
*B60K 41/08* (2006.01)
(52) U.S. Cl. .............. 701/54; 701/58; 477/91
(58) Field of Classification Search ........... None
See application file for complete search history.

(56) References Cited
U.S. PATENT DOCUMENTS

| | | | | |
|---|---|---|---|---|
| 5,136,897 A | * | 8/1992 | Boardman | 477/84 |
| 5,272,632 A | * | 12/1993 | Noguchi et al. | 701/59 |
| 5,301,572 A | * | 4/1994 | Tanaka et al. | 475/123 |
| 5,812,957 A | * | 9/1998 | Iizuka | 701/58 |
| 6,319,170 B1 | | 11/2001 | Hubbard et al. | |
| 6,456,919 B1 | | 9/2002 | Koerner et al. | |
| 2002/0107626 A1 | * | 8/2002 | Graf | 701/54 |

FOREIGN PATENT DOCUMENTS

DE  42 10 626 A1  3/1992
DE  199 33 312 A1  7/1999

(Continued)

*Primary Examiner*—Michael J. Zanelli
(74) *Attorney, Agent, or Firm*—Crowell & Moring LLP

(57) ABSTRACT

In a method for operating a drive train having a drive motor and an automated variable speed transmission, in selected situations, such as when there is a change in the gear speed of the variable speed transmission, it is advantageous to calculate the profile of the rotational speed of the drive motor in advance. For this purpose, pre-stored profile parameters (for example in the form of gradient values when changes in rotational speed are requested) are corrected as a function of a requested difference in rotational speed. Alternatively, in addition to a corrected gradient it is possible to calculate a corrected reaction times, and to carry out the calculation in advance by means of these variables. The reaction time is obtained as a time difference between actuation of a significant change in a state variable (for example a rotational speed) of the drive train. If no previously stored values are available, changes in rotational speed can be requested and the resulting gradients and/or reaction times can be stored.

19 Claims, 3 Drawing Sheets

FOREIGN PATENT DOCUMENTS

| | | |
|---|---|---|
| DE | 199 62 963 A1 | 12/1999 |
| DE | 100 40 657 A1 | 8/2000 |
| EP | 0 512 728 A2 | 4/1992 |
| EP | 0 676 566 A1 | 3/1995 |
| EP | 0 925 990 A2 | 6/1999 |
| JP | 2002-530607 A | 9/2002 |
| WO | WO 98/17929 | 4/1998 |
| WO | WO 00/31442 | 6/2000 |

\* cited by examiner

METHOD FOR OPERATING A DRIVE TRAIN OF A MOTOR VEHICLE

BACKGROUND AND SUMMARY OF THE INVENTION

This application claims the priority of German patent document 102 43 495.6, filed Sep. 19, 2002 (PCT International Application PCT/EP2003/009645, filed Aug. 30, 2003), the disclosure of which is expressly incorporated by reference herein.

The invention relates to a method for operating a drive train of a motor vehicle.

European patent document EP 0 676 566 A1 discloses a method for operating a drive train of a motor vehicle with an automatic transmission that can be connected to a drive motor (in the form of an internal combustion engine), via a clutch. The transmission is shifted up when the clutch is closed, and the necessary deceleration of an input shaft of the transmission during a synchronization phase is carried out by the internal combustion engine. In this context, a profile parameter in the form of a gradient, of a rotational speed of the internal combustion engine is determined by a control device during the synchronization phase. A current gradient is established by means of the determined gradient and a pre-stored gradient and is used to predetermine a profile of the rotational speed of the internal combustion engine during a subsequent shifting up operation.

In view of the above, one object of the invention is to permit particularly accurate predetermination of the profile of the rotational speed of the drive motor when there is an actuated changed in the rotational speed.

This and other objects and advantages are achieved by the method according to the invention, for operating a vehicle drive train that includes a drive motor (for example, in the form of an internal combustion engine) and an automatic variable speed transmission. A driving off element in the form of a clutch or a hydrodynamic torque converter can be arranged between the drive motor and the automatic variable speed transmission. The clutch may be, for example, as a friction clutch, and may be actuated by an actuator element or a driver of a vehicle. (In an automatic variable speed transmission, switching elements can be actuated by means of actuator elements.) The variable speed transmission may be synchronized or nonsynchronized, and can also have a front-mounted transmission, for example by means of a split group.

The drive motor has actuator elements which are actuated by a control device. For example, the control device can predefine an injection quantity of a fuel, an ignition time or the use of what are referred to as engine brakes, for example in the form of an exhaust flap or a constant throttle.

The control device processes a rotational speed of the drive motor which it senses by means of a rotational speed sensor, which is fed to it by a further control device or is obtained from the rotational speed of the drive motor. For example, it is possible to process the rotational speed of a transmission input shaft which can be coupled to the drive motor by means of the clutch. When there is a request for a change in rotational speed of the drive motor from a starting rotational speed to a target rotational speed, the control device actuates the actuator elements in such a way that the target rotational speed is set. The target rotational speed can remain the same during the change or can change. For example, during a shifting operation from an original gear speed into a target gear speed of the variable speed transmission with the clutch closed, the rotational speed of the drive motor must be set to a synchronization speed of the target gear speed during a synchronization phase. The synchronization speed of the target gear speed is proportional here to a speed of the motor vehicle. If the speed of the motor vehicle changes during the synchronization phase, the synchronization speed of the target gear speed, and thus the target rotational speed of the change in rotational speed, also change.

When there is an actuated change in rotational speed of the drive motor during a neutral position of the variable speed transmission (that is, when no gear speed is engaged or while the clutch is opened), current profile parameters, for example in the form of a gradient, of the change in rotational speed are established. As a result, during the establishment of the parameters there is no connection between the input shaft and an output shaft of the variable speed transmission.

Corrected profile parameters are then established using previously stored profile parameters and the current profile parameters. The previously stored profile parameters are stored here in the control device of the drive motor or in some other control device. These values can be stored permanently or may be variable. The profile of the rotational speed of the drive motor is predetermined by means of the corrected profile parameters in selected operating states, for example when there is a shifting operation of the variable speed transmission.

The determination of the current and corrected profile parameters can be carried out by the control device of the drive motor or by a further control device (for example a control for the variable speed transmission). It is also possible for the current profile parameters to be determined by a control device, for example the drive motor, and for the corrected profile parameters to be determined by some other control device, for example the variable speed transmission.

Profile parameters of the change in rotational speed may be, for example, a gradient of the change in rotational speed between the starting rotational speed and the target rotational speed, a plurality of gradients for successive sections of the change in rotational speed or parameters of a spline approximation which is known per se.

A gradient of the change in rotational speed is established, for example, by measuring the rotational speed at various times and establishing the gradient using the differences in rotational speed which result from the measured rotational speeds, and the time intervals between the measurements. Furthermore, other methods for establishing gradients which are known to a person skilled in the art are applied.

A plurality of intermediate values of gradients can be calculated for successive sections during the change in rotational speed. The current gradient can be determined by averaging of the intermediate values of the gradients. During the averaging process all the intermediate values of the gradients can be weighted identically or else differently. Alternatively, the gradient may be determined only once, for example between two rotational speed values which lie near to the starting rotational speed or the target rotational speed. As a result, fluctuations in rotational speed which are superimposed on the actuated change are not taken into account.

When a change in rotational speed is calculated in advance, the profile can be composed of a plurality of straight segments with different gradients.

The parameters of a spline approximation of the rotational speed profile may be determined in a manner known per se, from measured rotational speed values and the associated time periods.

The corrected profile parameters are determined as a function of a starting rotational speed and/or target rotational speed of the change in rotational speed. The determination can also depend here only on the difference between the starting rotational speed and target rotational speed.

The invention makes use of the proposition that the gradient of the rotational speed during an actuated change in rotational speed is not constant. Rather, it is dependent, inter alia, on the rotational speed of the drive motor. For example, when no fuel is injected, what is referred to as an engine drag torque (that is, a negative torque) is produced, which reduces the rotational speed of the drive motor. The engine drag torque drops as the rotational speed of the drive motor decreases, so that the absolute value of the gradient becomes smaller as the rotational speed of the drive motor decreases when there is an actuated reduction in the rotational speed. Furthermore, the effect of engine brakes for reducing the rotational speed is also dependent on the rotational speed of the drive motor. (Thus, the braking effect of an exhaust valve at high rotational speeds is significantly greater than at low rotational speeds.) In addition, reaction times which greatly influence the required time period between the starting rotational speed and the target rotational speed (and thus the resulting gradient) come about between the actuation of the actuator elements of the drive motor and an effect on the rotational speed. For example, the time period between the actuation of an increase in torque and the start of a change in the rotational speed may be more than 100 ms. When a reduction in the rotational speed is supported by closing an exhaust flap, an exhaust gas counterpressure must first build up in order for an increased gradient to be subsequently brought about. When there is a small difference between the starting rotational speed and target rotational speed, this reaction time has a greater effect on the profile parameters (for example on the gradient which results between the starting rotational speed and target rotational speed) than when there is a large difference in rotational speed. As a result, the current profile parameters are also dependent on the difference in rotational speed.

When the current and the corrected profile parameters are determined as a function of the starting rotational speed and/or the target rotational speed, different profile parameters can be determined for different starting rotational speeds and/or target rotational speeds as well as various differences in rotational speed. When a profile of the rotational speed of the drive motor is predetermined it is then possible in each case to use a profile parameter which corresponds to the current starting rotational speed and/or target rotational speed. As a result, the profile of the rotational speed of the drive motor can be predetermined particularly accurately when changes in rotational speed are actuated.

Thus, when there is a change from an original gear speed into a target gear speed of the variable speed transmission, the actuator elements of the variable speed transmission are actuated in such a way that, when a desired distance from the synchronization speed is reached, the target gear speed is engaged, taking into account the delay times of the actuator elements. This permits particularly comfortable and rapid changes of gear speed.

In addition, the pre-stored profile parameters can be stored as a function of the starting rotational speed and the target rotational speed.

According to a further embodiment of the method according to the invention, when there is an actuated change in rotational speed, not only a corrected gradient but also a current reaction time are determined, and a corrected reaction time is established using the current reaction time and a pre-stored reaction time. The current reaction time is determined as a time period between an actuation time of an actuator element and a significant change in a state variable of the drive train (for example, the rotational speed, the gradient of the rotational speed or the torque which is output by the drive motor). The current reaction time can be established both when the actuator element is connected into the circuit and when it is disconnected from it. A significant change in the state variable is achieved if the change exceeds an adjustable limiting value. The limiting value may be dependent here on state variables of the drive train, for example the rotational speed or the temperature of the drive motor. For the calculation and pre-storage of the reaction time the same described possibilities and alternatives apply as to the calculation and the pre-storage of the gradient.

The determination of the gradient is not started until after the current reaction time has expired. As a result, a starting rotational speed can be obtained which differs slightly from that which is obtained when the determination is carried out without considering the reaction time. The gradient established in this way is independent of the reaction time of the actuator elements, and thus also of the difference in rotational speed between the starting rotational speed and target rotational speed. Calculation of the rotational speed of the drive motor in advance in selected operating states is therefore very accurate.

In one embodiment of the invention, the corrected gradient and/or the corrected reaction time are determined as a function of the starting rotational speed and/or target rotational speed. As a result, the described different effects of the actuator elements are taken into account with different rotational speeds of the drive motor. The calculation of the rotational speed in advance is therefore particularly accurate.

In one embodiment of the invention, the corrected gradient and/or the corrected reaction time are determined by averaging the pre-stored values and the current values, ensuring a continuous approximation to the actual conditions. In addition, this prevents excessive changes in the corrected values, which could adversely affect control parameters of the drive train. In addition, an incorrect determination of a current value cannot have excessive effects on the corrected values.

For example, averaging using a weighted sum can be carried out. In such a case the current and pre-stored values are multiplied by the same or different factors and then added. The corrected values are then established by dividing the sum by the sum of the aforesaid factors.

One or more pre-stored values can be included in the averaging.

In another embodiment of the invention, deviations of the current gradient and/or the current reaction time from the pre-stored values are determined. If the deviations exceed adjustable limiting values, the pre-stored values are adopted for the corrected gradient and/or for the corrected reaction time. The limiting values may be dependent on the number of adaptation steps, the starting rotational speed and/or target rotational speed, on state variables of the drive train and/or on actuating variables of the drive motor. Incorrectly determined values can thus be excluded from consideration.

In one embodiment of the invention, the corrected gradient and/or the corrected reaction time are stored and used as pre-stored values in the subsequent determination of the corrected gradient and/or of the corrected reaction time. The storage can also be retained when the motor vehicle is started up again after having been parked. As a result there is continuous adaptation of the corrected values to the actual conditions and changes over the service life of the motor vehicle can be taken into account.

It is possible in each case to store only the corrected value or, in addition to a basic value, to store a deviation from the basic value. The deviation may be stored, for example, as a correction factor or a correction value which is added to the basic value. As a result, the changes can be reversed and the adaptation restarted. A restart may take place, for example, when an actuator element is exchanged. Furthermore, relatively small changes can be resolved and thus stored since the deviations do not differ so much, and thus a higher resolution of the count value is possible with the same storage space. In addition, a reduction in the quantity of data to be stored by the control device of the variable speed transmission can be achieved by storing the basic values in a different control device, for example the control device of the drive motor.

In still another embodiment of the invention, it is established how often the corrected gradient and/or the corrected reaction time have been determined. The averaging is dependent on the established frequencies. As a result, greater account can be taken of the current values (for example at the start of the adaptation of the values, when the corrected values have not yet been established often), so that more rapid adaptation of the values can be achieved. After an adjustable number of adaptation steps it is possible to assume that the adaptation is good. As a result, the influence of the current values can be reduced. For example, given a weighted sum the factors can change with the number of adaptation steps.

The weightings can also be dependent here on the starting rotational speed and/or target rotational speed, on state variables of the drive train and/or on manipulated variables of the drive motor.

In still another embodiment of the invention, the corrected gradient and/or the corrected reaction time are established as a function of state variables of the drive train. (State variables of the drive train are, for example, the temperature of the drive motor, the temperature of the variable speed transmission or the setting of a front-mounted transmission of the variable speed transmission.) The storage of the values and the predetermination of the rotational speed of the drive motor are then also carried out while taking into account state variables of the drive train. This permits particularly accurate predetermination to be carried out.

In one embodiment of the invention, the corrected gradient and/or the corrected reaction time are established as a function of actuated manipulated variables of the drive motor. (Manipulated variables are, for example, the fuel injection quantity, the ignition time or actuated engine brakes.) The storage of the values and the predetermination of the rotational speed of the drive motor are then also carried out taking into account the manipulated variables. This permits particularly accurate predetermination to be carried out.

In another embodiment of the invention, when there is a gear speed change of the variable speed transmission, a gear speed is selected as a function of the corrected gradient and/or the corrected reaction time. When carrying out a shifting operation it is necessary to ensure that, after the target gear speed has been engaged, the drive motor is at an appropriate operating point (for example, that the rotational speed is not too high and not too low). During the shifting of a variable speed transmission the force flux from the drive motor to drive vehicle wheels is interrupted, and it is not possible to apply any drive torque. The speed of the motor vehicle may thus change greatly during the shifting process depending on the driving resistances, for example load or uphill/downhill travel. The duration of a shifting process can be calculated very accurately in advance using the corrected gradient and/or the corrected reaction time. As a result, given known or calculated driving resistances, the speed of the motor vehicle can be determined very accurately when the target gear speed is engaged. The operating point of the drive motor in the target gear speed can therefore be determined in advance and checked. If the operating point which is calculated is unfavorable, the selection of the target gear speed can be corrected, and a particularly advantageous target gear speed can be selected. In addition, shifting processes which cannot be carried through to their conclusion are suppressed.

According to a further feature of the invention, when the drive train is initially put into operation (in particular, when the variable speed transmission is in the neutral position), the drive motor is actuated in such a way that changes in rotational speed occur. Initial operation occurs, for example, when the drive train has been installed for the first time or after an assembly (for example the drive motor) is replaced. During the actuated changes in rotational speed, reaction times are determined as a time period between an actuation time and the time at which a change in a state variable of the drive motor exceeds an adjustable limiting value, and/or gradients of the changes in rotational speeds are determined. The reaction times and/or gradients which are determined are determined and stored in the control device of the drive motor or some other control device, for example of the variable speed transmission. As a result, the profile of the rotational speed of the drive motor can be calculated in advance in selected operating states, for example during the shifting processes of the variable speed transmission.

The sequence of actuation can be stored in a control device of the drive train and started by means of a signal, for example a momentary contact switch or a connected signal transmitter. Alternatively, the sequence can also be stored on an additional device which can be connected in a signal transmitting fashion to one or more control devices of the drive train. The additional device can transmit the actuation signals to the control device of the drive motor on request. A further possibility is for the driver of the vehicle to start a learning process by means of a signal, and to influence the torque (and thus the rotational speed of the drive motor) by means of an accelerator pedal.

The method according to the invention permits calculation in advance, immediately after initial operation, even if no advance information whatsoever is available about the operating behavior of the drive motor. As a result, for example when there is a change in gear speed of the variable speed transmission, an advantageous selection of the target gear speed, as described above, is possible immediately.

In one embodiment of the invention, the gradient and/or the reaction time are established as a function of:

the starting rotational speed and/or target rotational speed of the change in rotational speed;

state variables of the drive train; and/or actuated manipulated variables of the drive motor.

Other objects, advantages and novel features of the present invention will become apparent from the following detailed description of the invention when considered in conjunction with the accompanying drawings.

BRIEF DESCRIPTION OF THE DRAWINGS

FIG. 3b is a diagram of an actuation signal of an exhaust flap and of the output torque of the drive motor plotted against time, when shifting up in accordance with FIG. 3a.

DETAILED DESCRIPTION OF THE DRAWINGS

Figure 1:
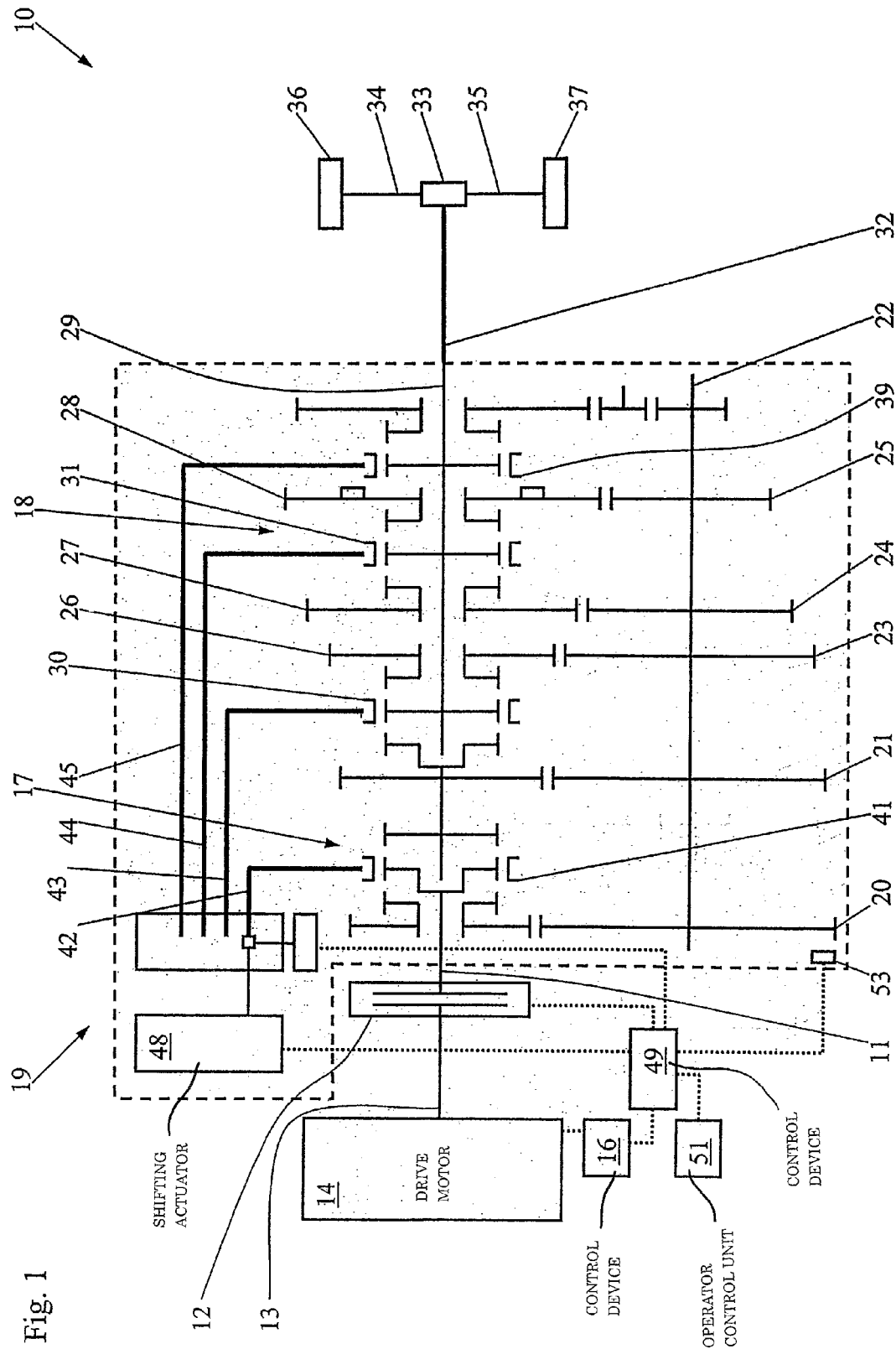
FIG. 1 is a schematic depiction of a drive train of a motor vehicle with an automatic variable speed transmission.

According to FIG. 1, a drive train 10 of a motor vehicle (not illustrated) has a drive motor 14 which is actuated by a control device 16 that transmits manipulated variables to actuator elements (for example for an exhaust flap, not illustrated) of the drive motor 14. The control device 16 is also coupled in signal communication with sensors (not illustrated), for example a rotational speed sensor or a temperature sensor by means of which state variables of the drive motor 14 can be sensed.

The drive motor 14 can be connected by means of an output shaft 13 and a friction clutch 12 to an input shaft 11, arranged coaxially with respect to the output shaft 13, of an variable speed automatic transmission 19. The clutch 12 and the variable speed transmission 19 are actuated by a control device 49. The control device 49 is connected in a signal transmitting fashion to actuator elements (not illustrated) and sensors of the clutch 12 and of the variable speed transmission 19. As a result, the control device 49 can open or close the clutch 12 and carry out gear speed changes in the variable speed transmission 19. State variables such as rotational speeds or temperatures of the clutch 12 and of the variable speed transmission 19 can be sensed by means of the sensors. In addition, the control device 49 is connected in a signal transmitting fashion to the control device 16, as a result of which data, for example state variables of the drive motor 14 or of the variable speed transmission 19, can be exchanged and it is possible to request changes in the rotational speed of the drive motor 14, which are then implemented by the control device 16. The control device 49 is also connected to an operator control unit 51 by means of which a driver of a vehicle can request gear speed changes of the variable speed transmission 19. Alternatively, gear speed changes from an original gear speed into a target gear speed can also be triggered in a manner known per se by the control device 49. The establishment of the target gear speed is dependent, inter alia, on the speed of the motor vehicle and on a degree of activation of an accelerator pedal by the driver of the vehicle.

The variable speed transmission 19 is embodied as what is referred to as a two group transmission. A front-mounted transmission in the form of a split group 17 is connected fixed in terms of rotation to the transmission input shaft 11. The split group 17 has a main transmission 17 arranged downstream of it.

By means of the split group 17, the transmission input shaft 11 can be operatively connected, via two different gearwheel pairings 20, 21, to an idler shaft 22 which is arranged parallel to the transmission input shaft 11. The gearwheel pairings 20, 21 have a different transmission ratio and moments of mass inertia. Fixed gearwheels 23, 24, 25 for the 3rd, 2nd and 1st gear speed of the main transmission 18 are arranged on the idler shaft 22 so as to be fixed in terms of rotation. The fixed gearwheels 23, 24, 25 each intermesh with associated freely moving gearwheels 26, 27, 28 which are rotatably arranged on a main shaft 29 which in turn is arranged coaxially with respect to the transmission input shaft 11. The freely moving gearwheel 26 can be connected by means of a slider sleeve 30, and the freely moving gearwheels 27 and 28 by means of a slider sleeve 31, to the main shaft 29 in a rotationally fixed and positively locking fashion.

A slider sleeve 41 of the main group 17 and the slider sleeves 30, 31, 39 of the main transmission 18 can each be actuated with shifting rods 42, 43, 44, 45. As a result, a positively locking connection between the associated shifting elements and the main shaft 29 can be brought about or disconnected. The shifting rods 42, 43, 44, 45 can be actuated with a shifting actuator 48 which is actuated by the control device 49. If there is no gear speed engaged in the variable speed transmission 19 (that is, there is no freely moving gearwheel connected in a positively locking fashion to the main shaft 29), the variable speed transmission 19 is in what is referred to as the neutral position.

The converted torque and the rotational speed of the drive motor 14 are transmitted from the main shaft 29 by means of an output shaft 32 to a final drive 33 which transmits the torque in identical or different proportions to driven wheels 36, 37 via two drive shafts 34, 35.

When there is a gear speed change from an original gear speed to a target gear speed, the original gear speed must firstly be disengaged. Since the variable speed transmission 19 is nonsynchronized, in order to be able to engage the target gear speed the idler shaft 22, and thus also the input shaft 11, must be adjusted approximately to the synchronization speed of the target gear speed by means of the drive motor 14 when the clutch 12 is closed. The synchronization speed is reached when the freely moving gearwheel of the target gear speed and the main shaft 29 have the same rotational speed. The adjustment of the rotational speed of the idler shaft 22 is referred to as synchronization.

After the original gear speed has been disengaged (that is, in the neutral position of the variable speed transmission 19), the control device 49 of the variable speed transmission 19 requests a change in the rotational speed of the drive motor 14 to the synchronization speed of the target gear speed. The rotational speed of the drive motor 14 at the time of disengagement corresponds here to a starting rotational speed, and the synchronization speed corresponds to a target rotational speed. The request can be made by predefining the target rotational speed and by the control device 16 correspondingly adjusting the rotational speed. Alternatively, the control device 49 may also predefine a torque of the drive motor 14 which is then set. This is the way in which the control or regulation of rotational speed would be performed by the control device 49.

Since the main shaft 29 is connected to the driven wheels 36, 37, the rotational speed of the main shaft 29, and thus the synchronization speed of the target gear speed, is proportional to the speed of the motor vehicle, with the proportionality factor corresponding to the transmission ratio between the vehicle's wheels and the shifting element to be synchronized. After the target gear speed has been disengaged, the drive motor 14 is no longer connected to the driven wheels 36, 37, and it is therefore impossible for any torque to be transmitted from the drive motor 14 to the driven wheels 36, 37. As a result in the neutral position of the variable speed transmission the speed of the motor vehicle can change only as a function of the driving resistances. For example, when there is a large load, in particular when the motor vehicle is embodied as a utility vehicle, and there is a positive gradient or a negative gradient of the roadway, the difference in speed at the start and at the end of the synchronization will be very large. As a result, the target speed of the request will also change greatly. FIGS. 2a, 2b, 2c, 2d, 3a and 3b illustrate the variation of state variables of the drive motor 14 over time during shifting down and shifting up of the variable speed transmission 19 from an original gear speed to a target gear speed.

In FIGS. 2a, 2b, 2c, 2d, time is plotted on abscissas 60a, 60b, 60c, 60d, while a rotational speed is plotted on ordinates 61a, 61c, and torques are plotted on ordinates 61b, 61d. Similarly, in FIGS. 3a, 3b, time is plotted on abscissas 80a, 80b, while rotational speed is plotted on an ordinate 81a and actuation signal for an exhaust flap and a torque are plotted on an ordinate 81b.

Figure 2A:
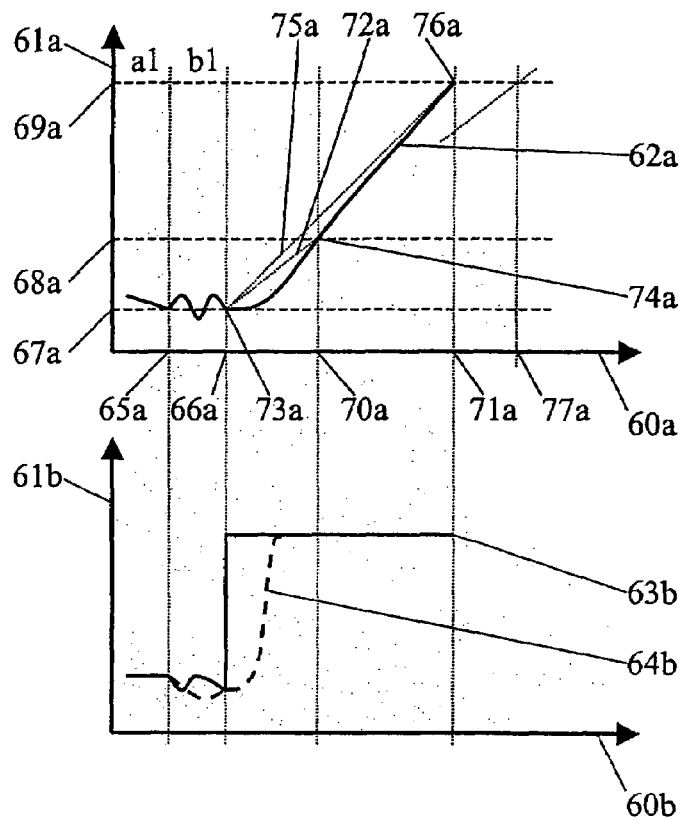
FIGS. 2a, 2c are diagrams representing the rotational speed of the drive motor plotted against time when the variable speed transmission shifts down.
Figure 2B:
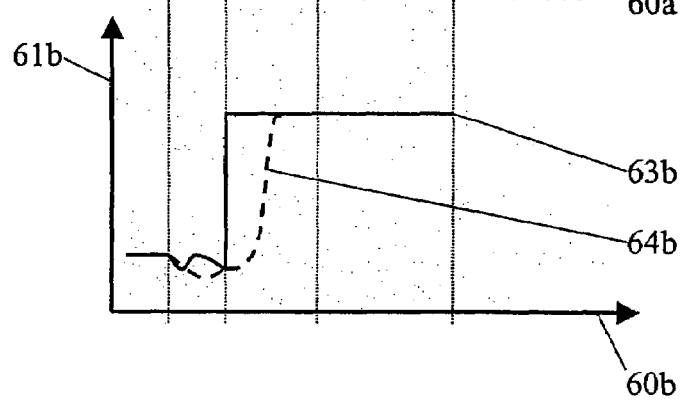
FIGS. 2b, 2d are diagrams of the setpoint value and the output torque of the drive motor plotted against time when shifting down occurs in accordance with FIGS. 2a and 2c.

In a phase a1 in FIG. 2a, the original gear speed is still engaged. The drive motor 14 outputs a low, constant torque and the motor vehicle becomes slower so that the rotational speed of the drive motor 14 drops. At the time 65a, the control device 49 decides, on the basis of the speed and the position of the accelerator pedal, that shifting down is to take place. For this purpose, the original gear speed must firstly be disengaged and the positively engaging connection between the slider sleeve and the freely moving gearwheel of the original gear speed must thus be disconnected. This connection can be disconnected only if a low torque is being transmitted via the connection. Since the shifting down is carried out when the clutch 12 is connected, the setpoint value of the torque, and therefore also, after a delay, the output torque of the drive motor 14, are changed, as illustrated schematically in phase b1. This also brings about a change in the rotational speed and permits the original gear speed to be disengaged. Alternatively, in order to disengage the original gear speed it is also possible to open the clutch 12 briefly and then close it again. The original gear speed is disengaged at the time 66a.

In order to be able to engage the target gear speed, a synchronization process must take place (that is, the rotational speed must be accelerated from a starting rotational speed 67a, the rotational speed at the time 66a, to a target rotational speed). In FIG. 2a, two different target rotational speeds 68a and 69a are illustrated by way of example. The target rotational speed 69a is higher than the target rotational speed 68a and thus corresponds to a lower gear speed. Since the intention is that the rotation speed will reach the target rotational speed as quickly as possible, the control device 16 requests a sudden increase in the torque at the time 66a, which is apparent from a jump in the setpoint value (line 63b). The output torque (line 64b) cannot directly follow this jump in the setpoint values.

For example, the output torque increases with a delay with respect to the setpoint profile due to reaction times of the actuator elements and inertia in the drive motor 14. The result of this is that the rotational speed of the drive motor 14 (line 62a) also does not rise immediately after the disengagement of the original gear speed (time 66a). After a transition phase, the rotational speed increases with an approximately constant gradient.

For a later calculation in advance of a requested change in rotational speed, for example when there is a later change of gear speed, a current gradient of the change in rotational speed is established during the synchronization. For this purpose, the time ($T_{ziel}$) when the target rotational speed is reached is determined and the gradient ($g_{akt}$) is calculated by dividing the difference between the target rotational speed ($n_{ziel}$) and starting rotational speed ($n_{start}$) by the period of time between the time when the target rotational speed is reached and the time when it is requested ($T_{start}$):

$$g_{akt} = \frac{n_{ziel} - n_{start}}{T_{ziel} - T_{start}}$$

It is then checked whether the current gradient deviates excessively from a gradient ($g_{speicher}$) which is pre-stored in the control device 49. For this purpose it is checked whether the difference between the current gradient and the stored gradient is greater than an adjustable limiting value. If this is the case, it is assumed that the current gradient has been determined incorrectly and the value is not used any more, and the pre-stored gradient is adopted as the corrected gradient.

If the deviation is not too large, the corrected gradient ($g_{korr}$) is calculated by means of a weighted sum using the pre-stored gradient ($g_{speicher}$) and the current gradient ($g_{akt}$):

$$g_{korr} = (g_{akt} + A * g_{speicher})/(A+1)$$

Here, A is a positive integer, for example 8. Practical experience has shown that A should preferably lie in a range between 5 and 25. As a result, the corrected gradient is determined by averaging and an incorrect value does not have an intolerably large effect.

This corrected gradient ($g_{korr}$) is stored in the control device 49 and used for the subsequent calculation as a pre-stored gradient. A value which represents a number of adaptations is incremented in parallel with this for each calculation of a corrected gradient. The parameter A of the weighted sum is changed as a function of this number. Starting from an adjustable limiting value, for example 150, A is increased, for example from 6 to 10, and the influence of an individual current gradient on the corrected gradient is thus reduced.

When calculating the profile of the rotational speed in advance, in particular the time ($T_{ziel}$) when the target rotational speed ($n_{ziel}$) is reached is determined. This time can be calculated from the starting time ($T_{start}$), the difference between the starting rotational speed ($n_{start}$) and target rotational speed, and the corrected gradient ($g_{korr}$):

$$T_{ziel} = T_{start} + \frac{n_{ziel} - n_{start}}{g_{korr}}$$

The first target rotational speed 68a is reached at a time 70a in FIG. 2a. The calculated first gradient corresponds to the positive gradient of the line 72a which connects a starting point 73a at the time 66a and a first target point 74a to one another.

The second target rotational speed 69a is reached at a time 71a. The calculated second gradient corresponds to the positive gradient of the line 75a which connects the starting point 73a and a second target point 76a to one another.

Due to the transition phase mentioned above the two gradients differ very greatly from one another. If, for example, the time when the target rotational speed 69a is reached is to be calculated in advance when there is a change in rotational speed from the starting rotational speed 67a to the second target rotational speed 69a, and the first gradient which is determined by means of the first target rotational speed 67a is used, a time 77a is obtained instead of the correct time 71a. The time when the second target rotational speed 69a is reached is calculated with a falsification equal to the time difference between the times 77a and 71a. Averaging between the first and second gradients would also give rise to an unsatisfactory result.

For this reason, the corrected gradient is determined as a function of the difference in rotational speed between the starting rotational speed and the target rotational speed. For this purpose, instead of only one gradient value, a gradient value is pre-stored for various ranges of differences in rotational speed in the control device 49 in each case. The ranges may be of different sizes, in particular small ranges are selected for small differences in rotational speed. For example, a first range covers differences in rotational speed from 0 to 50 rpm, a second covers differences in rotational speed from 50 to 100 rpm and a third covers differences in rotational speed from 100 to 200 rpm.

When the correct gradient is determined, checking is firstly carried out to determine which range of differences in rotational speed the established current gradient belongs to. For this purpose, the difference between the target rotational speed and starting rotational speed is established and the suitable range is determined by means of a comparison. A corrected gradient which is associated with this range is then calculated using the associated pre-stored gradient and the current gradient. The corrected gradient for the current range of differences of rotational speed is then stored. In addition to the dependence on the difference in rotational speed it is also possible to take into account other variables, for example the starting rotational speed or target rotational speed, the temperature of the drive motor 14 and/or a charge air pressure of the drive motor 14. For this purpose, not just one gradient is stored for each range of differences in rotational speed but rather a gradient is stored for various ranges of the further variables in each case. A corresponding procedure is then adopted when determining the corrected gradient.

When the profile of a requested change in rotational speed, in particular the time when the target rotational speed is reached, is calculated in advance, the necessary difference in rotational speed is also firstly determined and, if appropriate, further variables, for example the temperature of the drive motor 14, are determined. Then, the suitable gradient is determined from the total number of pre-stored gradients in accordance with the procedure for determining the current gradient. With this suitable gradient it is possible to calculate in advance the time when the target rotational speed will be reached by using the described formula. When there is a change in gear speed in the variable speed transmission 19, this corresponds to the time at which the target gear speed can be engaged.

When there are known or calculated driving resistances it is thus possible to calculate in advance the speed for engagement of the target gear speed even before the shifting process. As a result, the control device 49 checks whether the operating point of the drive motor 14 which then occurs is appropriate (that is, for example, whether the rotational speed lies in a specific range). If not, another target gear speed is selected immediately and the checking is repeated.

Figure 3A:
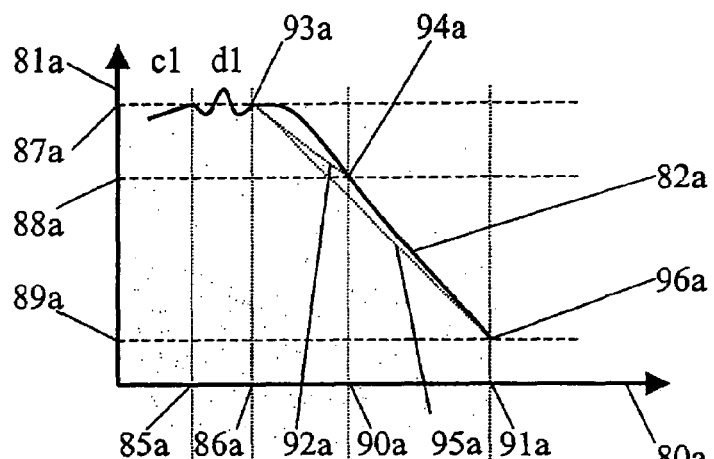
FIG. 3a is a diagram of the rotational speed of the drive motor plotted against time when the variable speed transmission shifts up.
Figure 3B:
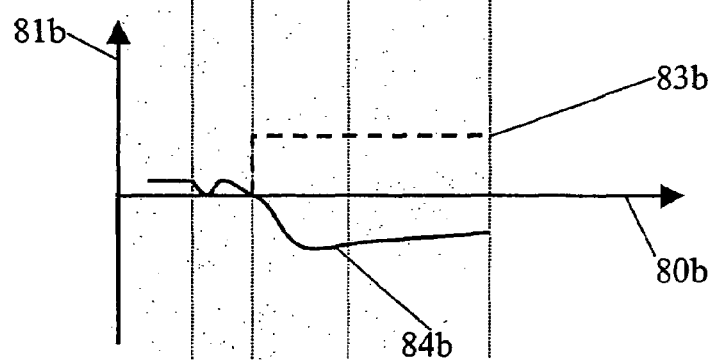

FIG. 3*a* illustrates the rotational speed profile of the drive motor 14, and FIG. 3*b* illustrates an actuation signal for an exhaust flap (line 83*b*) and the output torque of the drive motor 14 (line 84*b*) when the variable speed transmission 19 shifts up. In a phase c1, the original gear speed is engaged and the speed of the motor vehicle, and thus the rotational speed (line 82*a*) of the drive motor 14 increase. At the time 85*a*, the control device 49 decides to carry out a shifting up process. The shifting process is carried out with the clutch 12 closed. In the phase d1, the original gear speed is disengaged. At the time 86*a* the variable speed transmission 19 is in a neutral position.

In order to be able to engage the target gear speed, a synchronization process must take place (that is, the rotational speed must be decelerated from a starting rotational speed 87*a* to a target rotational speed). FIG. 3*a* illustrates by way of example two different target rotational speeds 88*a* and 89*a*. The target rotational speed 89*a* is lower than the target rotational speed 88*a* and thus correspond to a higher gear speed. Since the intention is that the rotational speed will reach the target rotational speed as quickly as possible, the control device 16 actuates a closing operation of an exhaust flap at the time 86*a* in order to increase the drag torque of the drive motor 14. The activation signal (line 83*b*) accordingly jumps from inactive to active at the time 86*a*. Before the drag torque rises, the exhaust flap must first be closed and an exhaust gas pressure must be built up. For this reason, the drag torque builds up only with a delay (line 84*b*). The result of this is that the rotational speed of the drive motor 14 (line 82*a*) also does not drop immediately after the original gear speed has been disengaged (time 86*a*). After a transition phase, the rotational speed drops with an approximately constant gradient.

In FIG. 3*a*, the first target rotational speed 88*a* is reached at a time 90*a*. The calculated first gradient corresponds to the gradient of the line 92*a* which connects a starting point 93*a* at the time 86*a* and a first target point 94*a* to one another.

The second target rotational speed 89*a* is reached at a time 91*a*. The calculated second gradient corresponds to the gradient of the line 95*a* which connects the starting point 93*a* and a second target point 96*a*.

Due to the transition phase which has been mentioned, the first gradient up to the point when the first target rotational speed 88*a* is reached (line 92*a*) deviates very greatly from the second gradient up to the point when the second target rotational speed 89*a* is reached (line 95*a*).

For this reason, the corrected gradient for shifting up operations must also be determined as a function of the difference in rotational speed between the starting rotational speed and the target rotational speed. The gradient during shifting up processes is also highly dependent on whether engine brakes are actuated, and if so which engine brakes are actuated. For this reason, separate gradients are pre-stored for calculation in advance, and used for calculation in advance, for all the possible actuation combinations of the engine brakes.

A further possible way of permitting accurate calculation of the rotational speed profile in advance is to calculate a corrected reaction time in addition to a corrected gradient. The same averaging, storage and dependencies on manipulated variables and state variables apply to the reaction time as to the gradient.

Figure 2C:
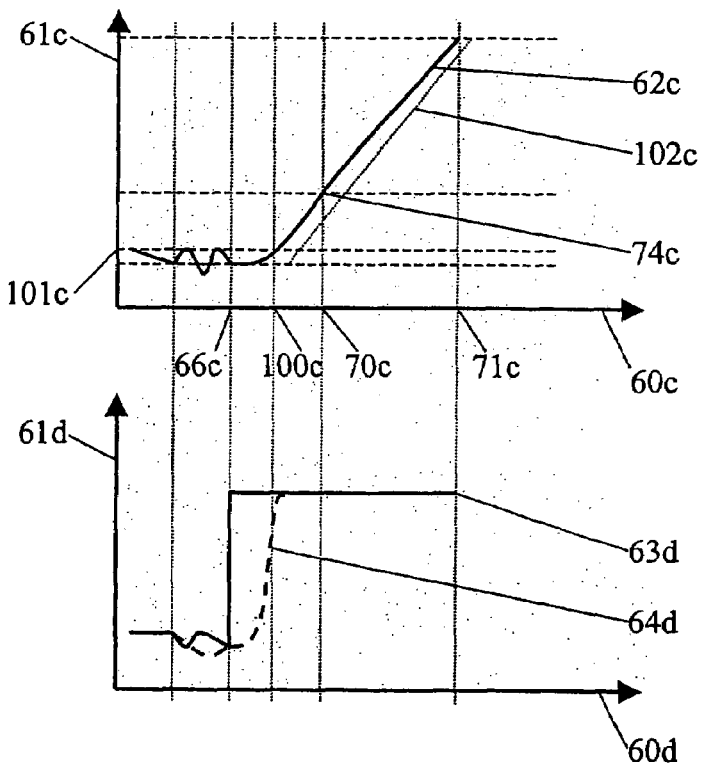
Figure 2D:
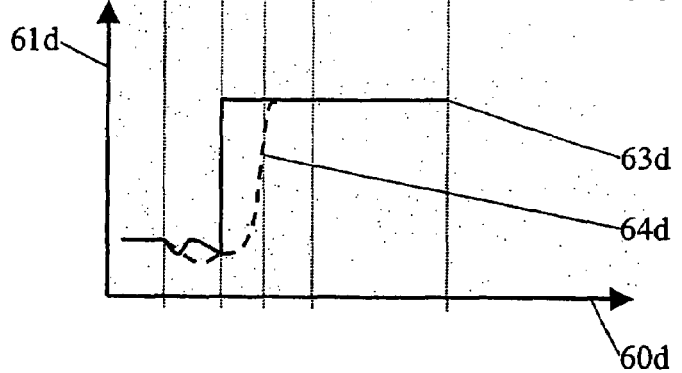

For this reason, details are given here only on the determination of the reaction time and the calculation in advance. In FIG. 2*c*, the same profile of the rotational speed (line 62*c*) is represented as in FIG. 2*a* (line 62*a*). The profiles of the torques (lines 63*d* and 64*d*) in FIG. 2*d* also correspond to the profiles (lines 63*b* and 64*b*) in FIG. 2*b*.

At the time 66*c*, the original gear speed is configured and an increase in the torque of the drive motor 14 is requested. As described, it takes some time until the torque is additionally available and the rotational speed starts to change. The rotational speed is monitored and a time 100*c* at which the rotational speed exceeds a rotational speed limit 101*c* is detected. The period of time between the disengagement of the original gear speed (time 66*c*) and the time when the rotational speed limit 101*c* (time 100*c*) is reached is determined as the current reaction time. Then, the current gradient is established with the time 100*c* and the rotational speed limit 101*c* and the first time 74*c* or the second time 76*c*. This gradient is independent of the difference in rotational speed between the target rotational speed and the starting rotational speed. The current gradient corresponds to the positive gradient of the line 102*c*.

The time ($T_{ziel}$) when the target rotational speed ($n_{ziel}$) is reached can thus be calculated from the starting time ($T_{start}$), the difference between the starting rotational speed ($n_{start}$) and target rotational speed, the corrected gradient ($g_{korr}$) and the corrected reaction time ($T_{reakt}$):

$$T_{korr} = T_{start} + T_{react} + \frac{n_{ziel} - n_{start}}{g_{corr}}$$

As an alternative to the starting rotational speed and the starting time it is also possible to use the rotational speed limit (101c in FIG. 2c) and the time when the rotational speed limit (100c in FIG. 2c) is reached.

In a way which corresponds to the determination and the taking into account of the reaction time at the start of the synchronization it is also possible to determine and take into account the reaction time at the end. This reaction time is obtained, for example, by a request for a reduction in the torque of the drive motor at the end of a shifting down process also not being implemented until after a certain time. Another example is the switching off of an engine brake for a shifting up process. In such a case a certain reaction time occurs until the engine brake ceases being effective and the gradient of the rotational speed changes. These reaction times and the delayed reactions of the rotational speed are not illustrated in the drawing.

In the case of a shifting up process, the described method can be used in an analogous fashion when determining the reaction time.

In the previous exemplary embodiments it has been assumed that pre-stored gradients and/or reaction times are present in the control device 49. If not (for example, in the case of an initial operation of the drive train or of the motor vehicle, such as after assembly at the so-called end of the line or after the drive motor 14 is replaced), these values have to be established. Establishment would be possible during ongoing operation of the motor vehicle but it can take a very long time until the entire number of prestored values are appropriately assigned and in addition shifting operations up to that time may be unsatisfactory.

For this reason, a value predefining unit (not illustrated) can be connected in a signal transmitting fashion to the control devices 16 and 49. By means of the value predefining unit it is possible, when requested by an operator of the control device 16, to predefine values for setting the rotational speed of the drive motor 14, as well as to predefine values for actuator elements, for example engine brakes. The process is carried out when the clutch 12 is closed and the variable speed transmission 19 is placed in the neutral position. Any combination of a change in rotational speed, in particular in difference in rotational speed and predefined values for the actuator elements is requested once or repeatedly. Gradients and/or reaction times are established from the resulting gradients and/or reaction times, if appropriate using an average value forming means, and are stored in the control device 49. A further adaptation process can then be carried out on the basis of these pre-stored values during the normal operation of the motor vehicle.

Figure 4:
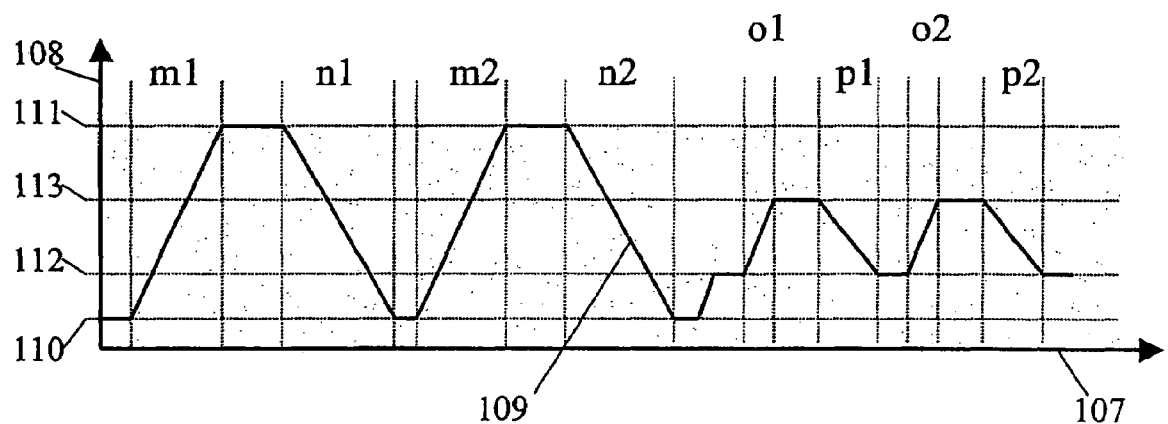
FIG. 4 is a diagram of the rotational speed of the drive motor plotted against time when initial operation takes place.

In FIG. 4, the time is plotted on an abscissa 107, and a rotational speed is plotted on an ordinate 108. A line 109 shows, for example, a setpoint profile for the rotational speed of the drive motor 14 as is requested by the value predefining unit.

In a phase m1, starting from a first rotational speed 110 a second rotational speed 111 is requested. After a waiting time, the first rotational speed 110 is actuated again in the phase n1. This process is repeated in the phases m2 and n2. In each case a gradient for the rise in rotational speed is detected in the phases m1 and m2 and an average value is subsequently formed. This average value is stored, including the information about the difference in rotational speed, in the control device 49. The gradients of phases n1 and n2 are used for precisely the same procedure with the additional factor that the information about an actuated engine brake is also stored.

After phase n2, a rise in the rotational speed from a rotational speed 112 to a rotational speed 113 is requested in phase o1 and a drop to the rotational speed 112 is requested in phase p2. This procedure is subsequently repeated in phases o2 and p2. The gradients are determined and stored in a way which corresponds to phases m1, m2, n1, n2.

In addition to a gradient, this method can also be used for determining and storing reaction times and gradients.

A more rapid drop in the rotational speed of the drive motor can also be brought about by connecting a retarder into the circuit, said retarder being operatively connected to the output shaft of the drive motor and being what is referred to as a primary retarder. Retarders are virtually wear-free sustained action brakes for motor vehicles, in particular utility vehicles. They may be embodied, for example, as hydrodynamic or electrodynamyc retarders.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating a drive train of a motor vehicle having a drive motor, a variable speed automatic transmission, and at least one control device for actuating the drive motor, said method comprising:
   the control device processing a rotational speed of the drive motor;
   when there is an actuated change in rotational speed of the drive motor from a starting rotational speed to a target rotational speed during a neutral position of the variable speed transmission, establishing current profile parameters of the change in rotational speed, based on the rotational speed; and
   thereafter, using pre-stored profile parameters and the current profile parameters, determining corrected profile parameters by which a profile of rotational speed of the drive motor in selected operating states is calculated in advance; and
   wherein, the corrected profile parameters are determined as a function of at least one of the starting rotational speed and the target rotational speed.

2. The method as claimed in claim 1, wherein a profile parameter is in the form of a gradient of the change in rotational speed.

3. The method as claimed in claim 2, wherein a corrected gradient is determined as a function of the difference between the starting rotational speed and the target rotational speed.

4. A method for operating a drive train of a motor vehicle having a drive motor, variable speed automatic transmission, and at least one control device for actuating the drive motor, said method comprising:
   the control device processing a rotational speed of the drive motor;
   when there is an actuated change in rotational speed of the drive motor from a starting rotational speed to a target rotational speed during a neutral position of the variable speed transmission, establishing a current gradient of the change in rotational speed;
   using a previously stored gradient value and the current gradient, determining a corrected gradient;

establishing a current reaction time as a time period between an actuation time and a time at which a change in a status variable of the drive train exceeds an adjustable limiting value;

determining a corrected reaction time using a previously stored reaction time and the current reaction time; and calculating in advance a profile of the rotational speed of the drive motor, using the corrected gradient and the corrected reaction time in selected operating states.

5. The method as claimed in claim 4, wherein at least one of the corrected gradient and the corrected reaction time is determined as a function of at least one of the starting rotational speed and the target rotational speed.

6. The method as claimed in claim 4, wherein the corrected gradient and/or the corrected reaction time are determined by averaging the previously stored values and the current values.

7. The method as claimed in claim 6, wherein:
deviations of at least one of the current gradient and the current reaction time from the previously stored values are determined; and
if the deviations exceed adjustable limiting values, the previously stored values are adopted for at least one of the corrected gradient and the corrected reaction time.

8. The method as claimed in claim 4, wherein at least one of the corrected gradient and the corrected reaction time is stored and used as previously stored values in the following determination of the corrected gradient or of the corrected reaction time.

9. The method as claimed in claim 8, wherein it is established how often at least one of the corrected gradient or the corrected reaction time have been determined, and how often the averages are dependent on the established values.

10. The method as claimed in claim 4, wherein the determination of the corrected gradient or of the corrected reaction time is dependent on state variables of the drive train.

11. The method as claimed in claim 4, wherein the determination of the corrected gradient or of the corrected reaction time is dependent on actuated manipulated variables of the drive motor.

12. The method as claimed in claim 4, wherein the determination of the current gradient or of the current reaction time is carried out during a synchronization operation when there is a change of gear speed of the variable speed transmission.

13. The method as claimed in claim 12, wherein a target gear speed is selected when there is a change in gear speed of the variable speed transmission, as a function of at least one of the corrected gradient and of the corrected reaction time.

14. A method for operating a newly installed drive train, or after replacement of an assembly thereof, of a motor vehicle having a drive motor, a variable speed automatic transmission and at least one control device for actuating the drive motor, and for processing a rotational speed of the drive motor, wherein in an initial operation of the drive train after installation or replacement;

the control device actuates the drive motor in such a way that changes in rotational speed occur;

profile parameters of the changes in rotational speed are determined, based on the rotational speed; and the profile parameters which are determined are stored.

15. The method as claimed in claim 14, wherein the profile parameters are in the form of one of:
a reaction time in the sense of a time period between an actuation time and a time at which a change in a state variable of the drive motor exceeds an adjustable limiting value; and
a gradient of the changes in rotational speed.

16. The method as claimed in claim 15, wherein:
changes in rotational speed of the drive motor are actuated repeatedly;
averages of the profile parameters which occur are formed; and
results of the averages are stored.

17. The method as claimed in claim 15, wherein the determination of the profile parameters is dependent on at least one of a starting rotational speed and target rotational speed.

18. The method as claimed in claim 15, wherein the determination of the profile parameters is dependent on state variables of the drive train.

19. The method as claimed in claim 15, wherein the determination of the profile parameters is dependent on actuated manipulated variables of the drive motor.

* * * * *